Figure 1:
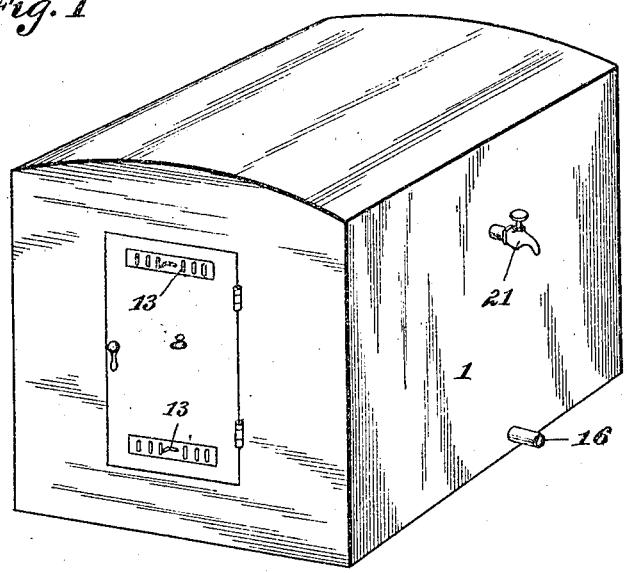

W. D. SINCLAIR.
REFRIGERATOR.
APPLICATION FILED NOV. 15, 1916.

1,286,192.

Patented Nov. 26, 1918.
2 SHEETS—SHEET 1.

Witness
C. F. Rudolph

Inventor
W. D. Sinclair,
By Victor J. Evans
Attorney

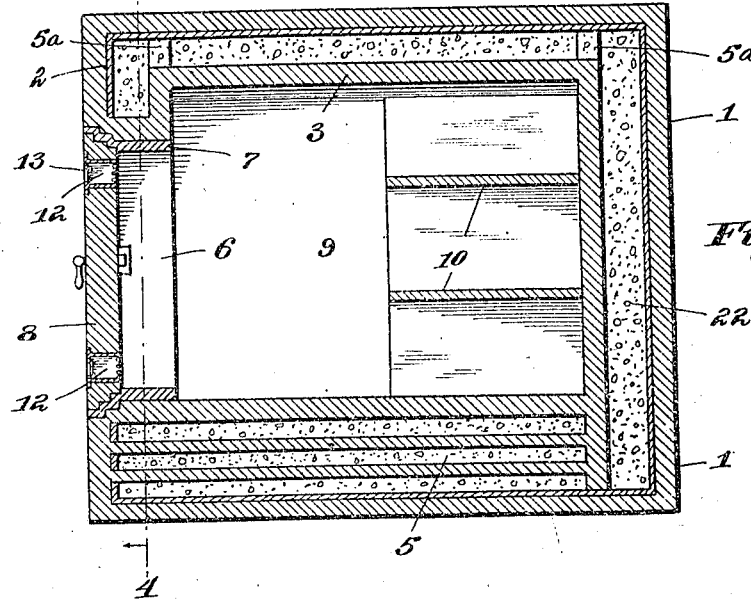
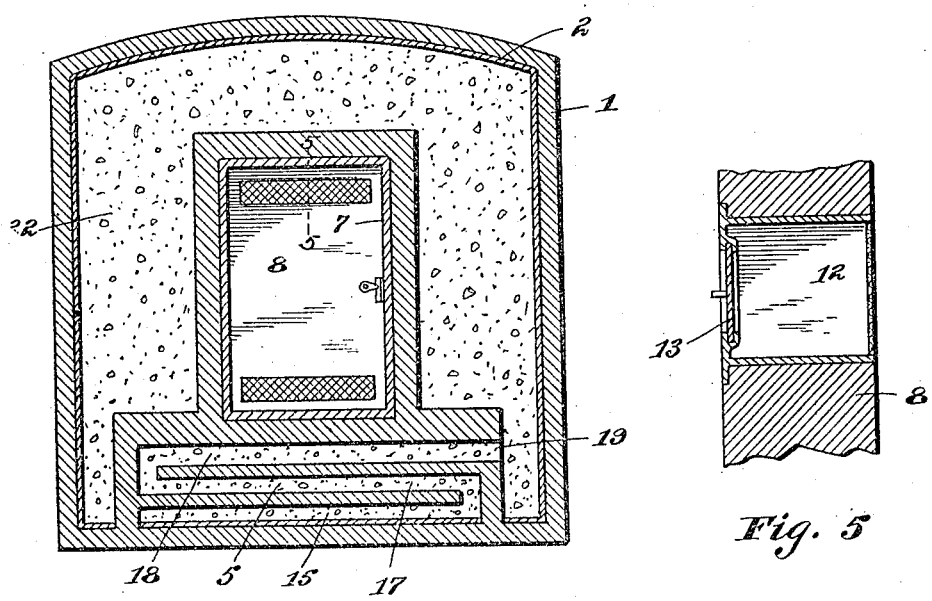

UNITED STATES PATENT OFFICE.

WILLIAM D. SINCLAIR, OF BAKER, OREGON.

REFRIGERATOR.

1,286,192.

Specification of Letters Patent.

Patented Nov. 26, 1918.

Application filed November 15, 1916. Serial No. 131,498.

*To all whom it may concern:*

Be it known that I, WILLIAM D. SINCLAIR, a citizen of the United States, residing at Baker, in the county of Baker and State of Oregon, have invented new and useful Improvements in Refrigerators, of which the following is a specification.

This invention relates to refrigerating devices for cool storage, in which articles of food are kept at a low temperature without the aid of ice.

An object of the invention is to construct a device for cool storage and for preserving articles of food in a cheap and simple manner wherein water is used as the refrigerating agent.

It is a further object of the invention to construct a device of this character of mason work, comprising spaced compartments one fully inclosing and surrounding the other whereby to produce a refrigerating space between the said compartments and said refrigerating space being entirely occupied by a refrigerating agent in the nature of a fluid, such as water, said refrigerator having inlet and outlet pipes for the said fluid to provide for the circulation of the fluid and to insure the proper cooling of the inner compartment.

With the above and other objects in view the improvement resides in the construction, combination and arrangement of parts set forth in the following specification and falling within the scope of the appended claim.

Figure 2:
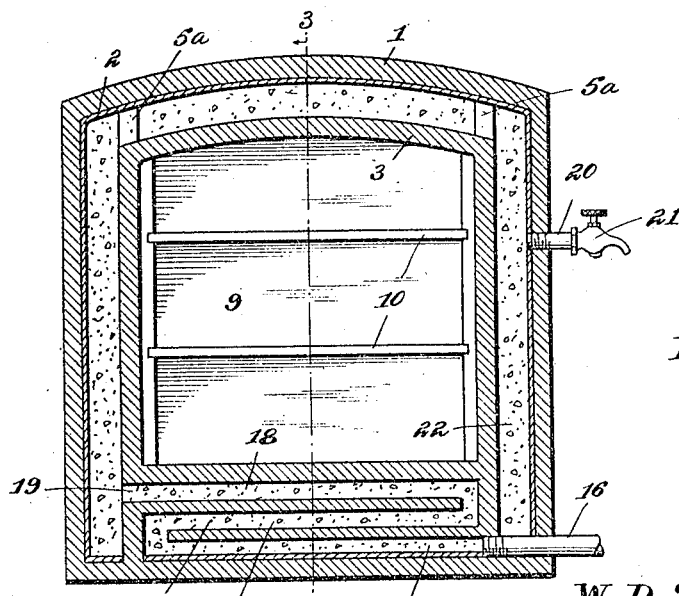

In the drawings:

Figure 1 is a perspective view of a refrigerating device constructed in accordance with the present invention, Fig. 2 is a central vertical longitudinal sectional view through the same, Fig. 3 is a horizontal sectional view approximately on the line 3—3 of Fig. 2, Fig. 4 is a transverse sectional view approximately on the line 4—4 of Fig. 3, and Fig. 5 is a sectional view approximately on the line 5—5 of Fig. 4.

The outer casing 1 of the improvement is preferably constructed of ordinary building bricks, or any desired construction of bricks of any desired size or proportion, laid in the usual manner and arranged so as to preferably construct the said casing in the form of a hollow square or rectangular structure. The inner walls of the structure comprising the casing 1 may be and preferably are coated with a suitable water proof material, such as a coating of cement, as indicated by the numeral 2. The inner casing is indicated by the numeral 3 and is of a construction corresponding to that of the outer casing being formed of bricks or other suitable masonry and being spaced to provide a hollow box. As stated the inner casing preferably corresponds to the shape of the outer casing and is wholly inclosed by the said outer casing, but, of course, of a smaller size than the said outer casing, and while the lower wall of the said inner casing is disposed a suitable distance above the lower wall of the inner casing, preferably in the construction of the said inner casing the sides and ends are extended below the lower wall of the inner casing and rest directly upon the lower wall of the outer casing, forming a pedestal 5 between the lower wall of the inner casing and the lower wall of the outer casing. The inner casing, at the top thereof, may be held in proper spaced relation with respect to the outer casing by piers or spacing members $5^a$, the said spacing members being preferably of the same material from which the device is constructed; that is, bricks.

Preferably the coating of water proof material is eliminated in the construction of the inner casing, but the inner casing is connected to the outer casing, at the front of the device by the usual construction of masonry or in the usual process of laying the bricks to provide the improvement with a door opening 6. The door opening has arranged therein a suitable frame 7 which is preferably constructed of wood and which has hingedly secured to one of the sides thereof the door 8. The door 8 may be, of course, of any desired material and may have its edges stepped to engage with steps provided in the frame, whereby to insure a tight joint between the door and frame, and consequently prevent the exit of the cold air from the food chamber 9 provided by the interior of the inner casing 3. The food chamber may have arranged therein the usual shelves 10 to receive the articles of food to be kept cool, and the door 8, adjacent to the top and bottom thereof, is provided with openings 12 that are closed or regulated by valve members 13, the said openings being in the nature of ventilators whereby fresh air may be allowed to pass within the food chamber 9.

The pedestal 5 is divided, by horizontally disposed spaced layers of bricks or if desired by other material, into a circulating or radiating chamber, the lower flue or leg 15 thereof having communicating therewith the inlet supply pipe 16, the lower leg of the said compartment communicating at its end opposite that provided with the inlet pipe with an opening which communicates with an intermediate leg 17 of the said compartment, and the said intermediate compartment at its end opposite that which communicates with the lower leg of the flue is provided with an opening that communicates with the upper leg of the said compartment and this upper leg, indicated for distinction by the numeral 18, has its end adjacent its communication with the leg 17 open, as at 19, the said opening communicating with the refrigerating space between the inner and outer shells or casings at one of the sides of the device. The outer casing, at a suitable distance below the top thereof and upon one of its sides is provided with an outlet pipe 20, which has preferably attached thereto a valve or faucet 21. Both the radiating compartments and the refrigerating spaces between the inner and outer casings are packed with a filtering medium 22 which is preferably in the nature of crushed charcoal but the same may have mixed therewith fine sand or other elements which will assist in the proper filtration of the water, and the water will circulate through the filtering medium between the inner and outer casings and as a consequence retain the food compartment 9 in a cooled condition. Furthermore, the water drawn through the faucet at the outlet of the device will be effectively filtered and will also be retained in a cooled condition.

It is to be understood that I am not to be restricted to size, shape or proportion, and it is thought that the simplicity and advantages of the device will be apparent without further detailed description.

Having thus described the invention, what I claim is:

A refrigerator comprising an outer and an inner casing spaced from each other, there being a hollow pedestal interposed between the bottom walls of the casings whereby the casings are held at fixed positions with relation to each other, said pedestal being provided with overlapping spaced walls therein providing flues through the pedestal and under the inner casing in the form of a tortuous passageway which communicates at its upper end with the space between the outer and inner casings at one side of the inner casing and an inlet supply pipe communicating with said pedestal.

In testimony whereof I affix my signature.

WILLIAM D. SINCLAIR.